(12) United States Patent
Palese et al.

(10) Patent No.: US 10,412,980 B2
(45) Date of Patent: Sep. 17, 2019

(54) DEHYDRATOR WITH INTELLIGENT TEMPERATURE CONTROL

(71) Applicant: BLUE SKY INNOVATION GROUP, INC., Avon, OH (US)

(72) Inventors: Jeffrey W. Palese, North Ridgeville, OH (US); Glenn Baker, Seven Hills, OH (US)

(73) Assignee: BLUE SKY INNOVATION GROUP, INC., Avon, OH (US)

( * ) Notice: Subject to any disclaimer, the term of this patent is extended or adjusted under 35 U.S.C. 154(b) by 369 days.

(21) Appl. No.: 15/260,552

(22) Filed: Sep. 9, 2016

(65) Prior Publication Data

US 2018/0070617 A1    Mar. 15, 2018

(51) Int. Cl.
| | |
|---|---|
| *F26B 21/00* | (2006.01) |
| *A23L 3/40* | (2006.01) |
| *A23B 4/03* | (2006.01) |
| *A23B 7/02* | (2006.01) |

(52) U.S. Cl.
CPC ............... *A23L 3/40* (2013.01); *A23B 4/031* (2013.01); *A23B 7/0205* (2013.01); *A23V 2002/00* (2013.01)

(58) Field of Classification Search
CPC ......... A23L 3/40; A23B 4/031; A23B 7/0205; A23V 2002/00; F26B 3/02; F26B 3/04; F26B 21/00; F26B 21/10; F26B 21/06; F26B 21/12; F26B 23/04
USPC ......... 34/495–497, 443, 476, 467, 486, 493, 34/508, 524, 549, 551, 553, 201, 202, 34/218, 413, 20, 2; 126/15 A, 15 R, 504, 126/77, 193
See application file for complete search history.

(56) References Cited

U.S. PATENT DOCUMENTS

| | | | |
|---|---|---|---|
| 10,045,546 B2 * | 8/2018 | Giebel | A23B 4/052 |
| 2014/0360387 A1 * | 12/2014 | Bogdon | A23B 4/0523 99/476 |
| 2017/0238565 A1 * | 8/2017 | Giebel | A23B 4/052 |

* cited by examiner

*Primary Examiner* — John P McCormack
(74) *Attorney, Agent, or Firm* — Tarolli, Sundheim, Covell & Tummino LLP

(57) ABSTRACT

A process for dehydrating products with a dehydrator that includes a dehydration chamber, a heater for heating air in the dehydration chamber, and a fan for circulating air in the dehydrator includes receiving a set temperature at which to perform the dehydration and a set time for which to perform the dehydration. The process also includes setting the heater to operate in an on condition and setting the fan to run at a low speed until the temperature in the dehydration chamber reaches the set temperature. The process further includes setting the heater to an off condition and setting the fan to run at a high speed when the temperature in the dehydration chamber reaches the set temperature.

8 Claims, 3 Drawing Sheets

DEHYDRATOR WITH INTELLIGENT TEMPERATURE CONTROL

TECHNICAL FIELD

This invention relates to a dehydrator for dehydrating products, such as food products. More specifically, this invention relates to a dehydrator that incorporates an intelligent temperature control feature s has a unique air distribution plenum configuration for promoting even and uniform dehydration performance in all regions of the dehydrator. The dehydrator also includes features for operation in cold climate scenarios, such as in a garage in cold winter months.

BACKGROUND OF THE INVENTION

Dehydrators are electric appliances used remove the water moisture, i.e., dry or dehydrate products, for example, food products, such as fruits, vegetables, and animal proteins (meat). The water content of food products is usually very high, typically 80% to 95% for various fruits and vegetables and 60% to 75% for various meats. Removing moisture from food restrains various bacteria from growing and spoiling food. Further, removing moisture from food dramatically reduces the weight of the food. Thus, food dehydrators are used to preserve and extend the shelf life of various foods. Dehydrators use a combination of heat and air flow to capture and remove the moisture from the food products.

Typically, a dehydrator includes a dehydrating chamber with a plurality of trays for supporting the product being dehydrated. The product is typically placed in a single layer on the trays. The trays typically are porous, incorporating holes, slots, rack wires, etc., to provide maximum surface area exposure of the product to the circulating air. To maximize capacity, dehydrators are typically configured so that the product tray layers extend wall to wall and from top to bottom to the greatest extent possible. To ensure that the product is dehydrated consistently and in a uniform manner, it is important to maintain the environmental conditions within the dehydrator consistent.

Within a batch of product processed in a dehydrator, the individual pieces of product within the batch should be dehydrated with both consistency and uniformity. Consistency at the batch level refers to the idea that when the dehydrator is run at prescribed settings for a proscribed period of time for a particular type of product, the product should be processed consistently to that particular level of dehydration. Uniformity at the batch level refers to the idea that, for any particular batch, all of the product in the batch should be processed to the same level of dehydration.

SUMMARY OF THE INVENTION

The invention relates to a process for dehydrating products with a dehydrator that includes a dehydration chamber, a heater for heating air in the dehydration chamber, and a fan for circulating air in the dehydrator includes receiving a set temperature at which to perform the dehydration and a set time for which to perform the dehydration. The process also includes setting the heater to operate in an on condition and setting the fan to run at a low speed until the temperature in the dehydration chamber reaches the set temperature. The process further includes setting the heater to an off condition and setting the fan to run at a high speed when the temperature in the dehydration chamber reaches the set temperature.

According to one aspect, the process can also include while the heater is in the off condition and the fan is set to run at high speed, determining whether the temperature in the dehydration chamber falls to or below a first predetermined temperature less than the set temperature. The process also can include continuing to run the fan at the high speed with the heater in the off condition in response to determining that the temperature in the dehydration chamber has not fallen to or below the first predetermined temperature. The process can further include continuing to run the fan at the high speed and setting the heater to operate in the on condition in response to determining that the temperature in the dehydration chamber has fallen to or below the first predetermined temperature. According to another aspect, the first predetermined temperature can be ten degrees below the set temperature.

According to another aspect, the process can also include, while the heater is in the on condition and the fan is set to run at high speed, setting a timer to countdown a predetermined amount of time. The process can also include determining whether the temperature in the dehydration chamber reaches the set temperature within the predetermined amount of time. The process can also include continuing to run the fan at the high speed and setting the heater to operate in the off condition in response to determining that the temperature in the dehydration chamber has reached the set temperature any time within the countdown.

The process can further include, after the countdown expires, setting the fan to run at the low speed and continuing to operate the heater in the on condition in response to determining that the temperature in the dehydration chamber has not reached the set temperature.

According to another aspect, the process can also include determining whether the temperature in the dehydration chamber falls to or below a second predetermined temperature less than the set temperature, the second predetermined temperature being lower than the first predetermined temperature. The process can also include setting the heater to the on condition and setting the fan to run at the low speed in response to determining that the temperature in the dehydration chamber falls to or below a second predetermined temperature less than the set temperature. The second predetermined temperature can be fifteen degrees below the set temperature.

According to another aspect, the process can also include determining whether the temperature in the dehydration chamber falls to or below a second predetermined temperature less than the set temperature, the second predetermined temperature being lower than the first predetermined temperature. The process can also include, while the fan is running in the high speed and the heater is in the on condition, and in response to determining that the temperature in the dehydration chamber falls to or below a second predetermined temperature less than the set temperature, setting the heater to the on condition and selling the fan to run at the low speed. The second predetermined temperature can be fifteen degrees below the set temperature.

According to another aspect, a dehydrator can include a controller configured to operate the heater and the fan according to any of the aforementioned processes.

BRIEF DESCRIPTION OF THE DRAWINGS

For a better understanding of the invention, reference may be made to the accompanying drawings.

DESCRIPTION OF EMBODIMENTS

Figure 1:
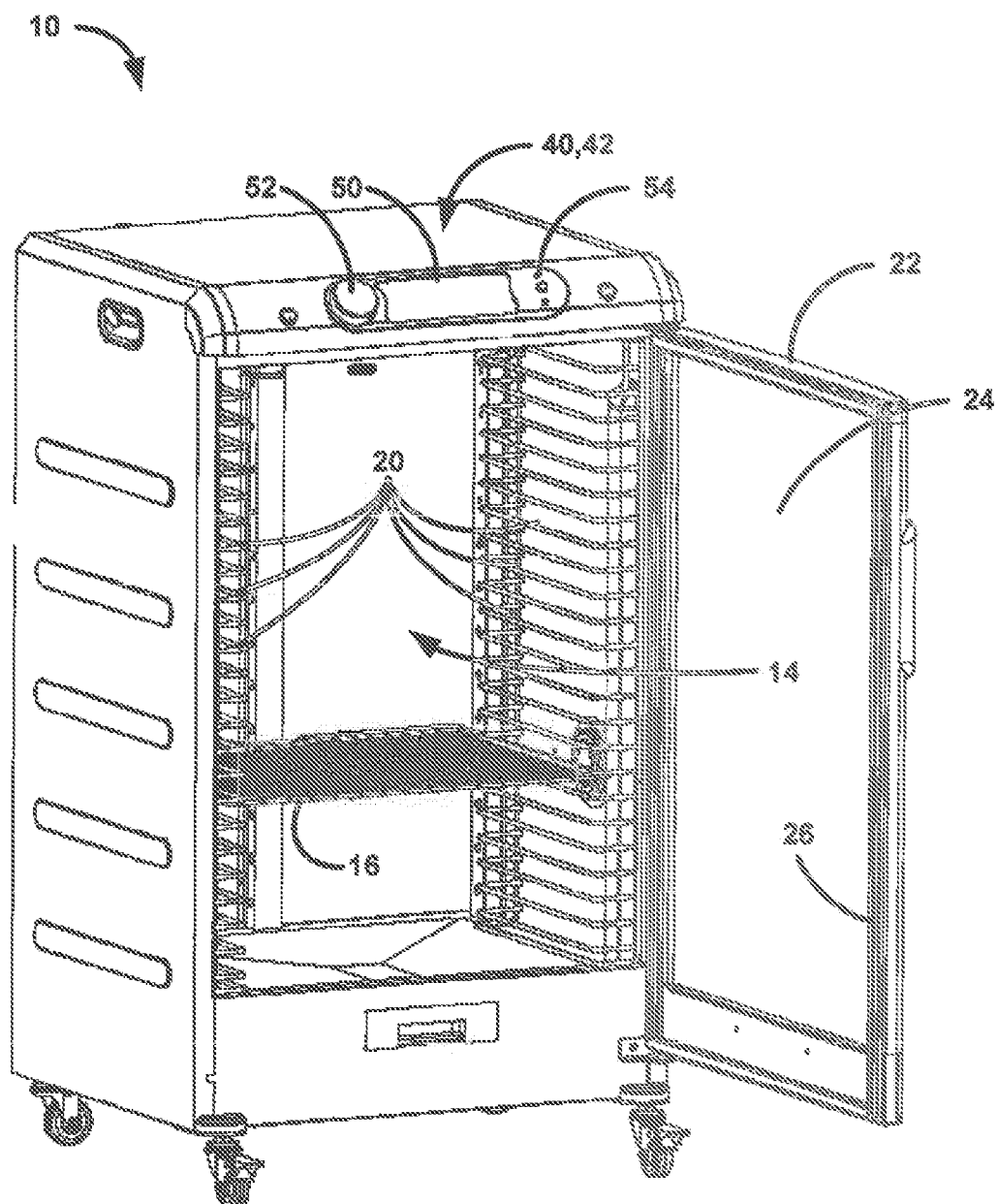
FIG. 1 is a front perspective view illustrating a food dehydrator.

An apparatus 10 for dehydrating products, i.e., a dehydrator, is illustrated in FIG. 1. The dehydrator 10 is capable of dehydrating any product for which dehydration is desired. For example, perhaps the most common product with which the dehydrator 10 can be used are food products, such as meats, fruits, and vegetables. In this description, when reference is made to "products" that are dehydrated by the dehydrator 10, it is meant to refer to any product, food or otherwise, for which dehydration is desired.

The dehydrator 10 includes a close walled frame 12 that defines a dehydrating chamber 14, having a generally rectangular chamber-like configuration, in which products, such as fruits, meats, or vegetables, are placed in order to remove moisture contained therein. The dehydrator 10 is adapted to support a plurality of racks in the dehydrating chamber 14. For simplicity, a single rack 16 is illustrated in FIG. 1. The rack 16 is supported at opposite ends by support bars 20. Thus, the illustrated dehydrator is capable of supporting a number of racks in the chamber 14 that is equal to the number of support bar pairs 20.

A door 22 can be closed to enclose the products in the dehydrating chamber 14. The door 22 may include a glass window 24 that allows the food dehydrating progress to be monitored. The door 22 can also include an edge seal 26, e.g., rubber or plastic, that helps isolate the dehydrating chamber 14 from the outside environment.

Figure 2:
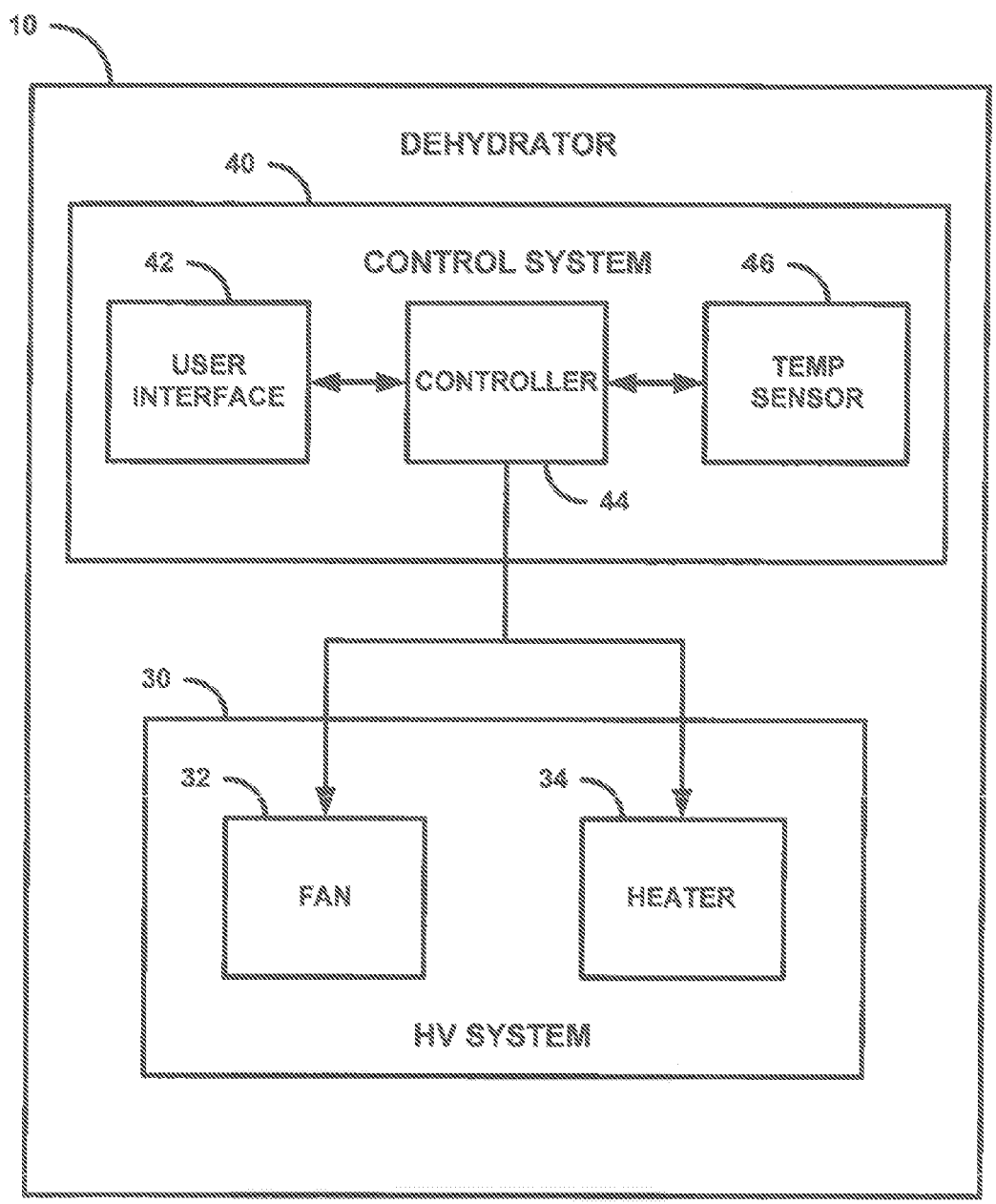
FIG. 2 is a schematic layout illustrating different systems of the dehydrator.

Referring to FIG. 2, the dehydrator 10 also includes a control system 40 for controlling its operation. In the embodiment illustrated in FIG. 1, the control system 40 can, for example, be located at least partially in the upper portion of the dehydrator above the dehydrating chamber 14 and above the door 22. The control system 40 includes a user interface 42 that is operatively connected to a controller 44. At least one temperature sensor 46 is also operatively connected to the controller 44 and is configured to provide a signal to the controller 44 that is indicative of the temperature in the dehydrating chamber 14.

Referring to FIG. 2, the dehydrator 10 also includes a heating and ventilation system 30 ("HV system"). Referring to FIG. 1, the HV system 30 can, for example, be located in a lower portion of the dehydrator 10, beneath the dehydrating chamber 14. The HV system 30 includes a blower or fan 32 and a heating unit or heater 34, both of which are controlled by the controller 44 residing in the control module 40. In the example embodiment of FIG. 1, the fan 32 can be adapted to draw ambient air into the HV system 30 from the bottom of the dehydrator 10 and force that air through the heater 34 and into the dehydrating chamber 14, where it is circulated over the products and eventually is vented back to the atmosphere through a vent at the top of the dehydrating chamber 14.

The user interface 42 is configured to allow a user to control the operation of the dehydrator 10, e.g., by setting temperatures, dehydrating time, etc. The user interface 42 can therefore have any configuration suited to achieve this purpose. In the example embodiment illustrated in FIG. 1, the user interface 42 includes a display screen 50, a control knob or wheel 52, and one or more buttons 54. The controller 44 can be any programmable device, such as a microcomputer, that can programmed to execute instructions to control operation of the fan 32 and heater 34 in accordance with settings input by the user via the interface 42 and temperature data received via the sensor 46.

The dehydration of the products depends on the flow of warm dry air over the products in the dehydrating chamber 14. Therefore, those skilled in the art will appreciate that it can be important that the air flow within the dehydrating chamber 14 maintains a consistent temperature throughout the dehydration process. Additionally, the ambient conditions in which the dehydrator is operated can vary widely, both in terms of temperature and relative humidity. For instance, hunters using the dehydrator to process game into jerky may operate the dehydrator in a garage or outdoors, where temperatures and relative humidity can vary greatly. This process could, however, just as easily take place in a climate controlled indoor location, such as a kitchen.

Since the dehydrator draws ambient air for circulation in the dehydration chamber 14, the ambient surroundings from which this air is drawn can affect greatly the operation of the dehydrator 10. If the fan 32 and, more importantly, the heater 34 are not controlled in a manner that takes this into account, then the lifecycle of one or both of those components can be compromised.

According to the invention, the control system 40 is configured to control operation of the HV system 30 to maintain the desired temperature in the dehydration chamber 14 throughout the dehydration process regardless of the ambient conditions in which the dehydrator 10 is operated. The HV system 30 and the control system 40 are configured to avoid excessive on-off cycling of the HV system 30, i.e., excessive on-off cycling of the fan 32, heater 34, or both the fan and the heater. To do this, the fan 32 is configured to have more then one speed setting, such as a high speed setting and a low speed setting. The control system 40 is configured to control the operation of the fan 32 in one of an OFF, LOW speed and HIGH speed settings in response to the settings received via the user interface, and the temperature in the dehydration chamber 14 measured by the sensor 46.

Figure 3:
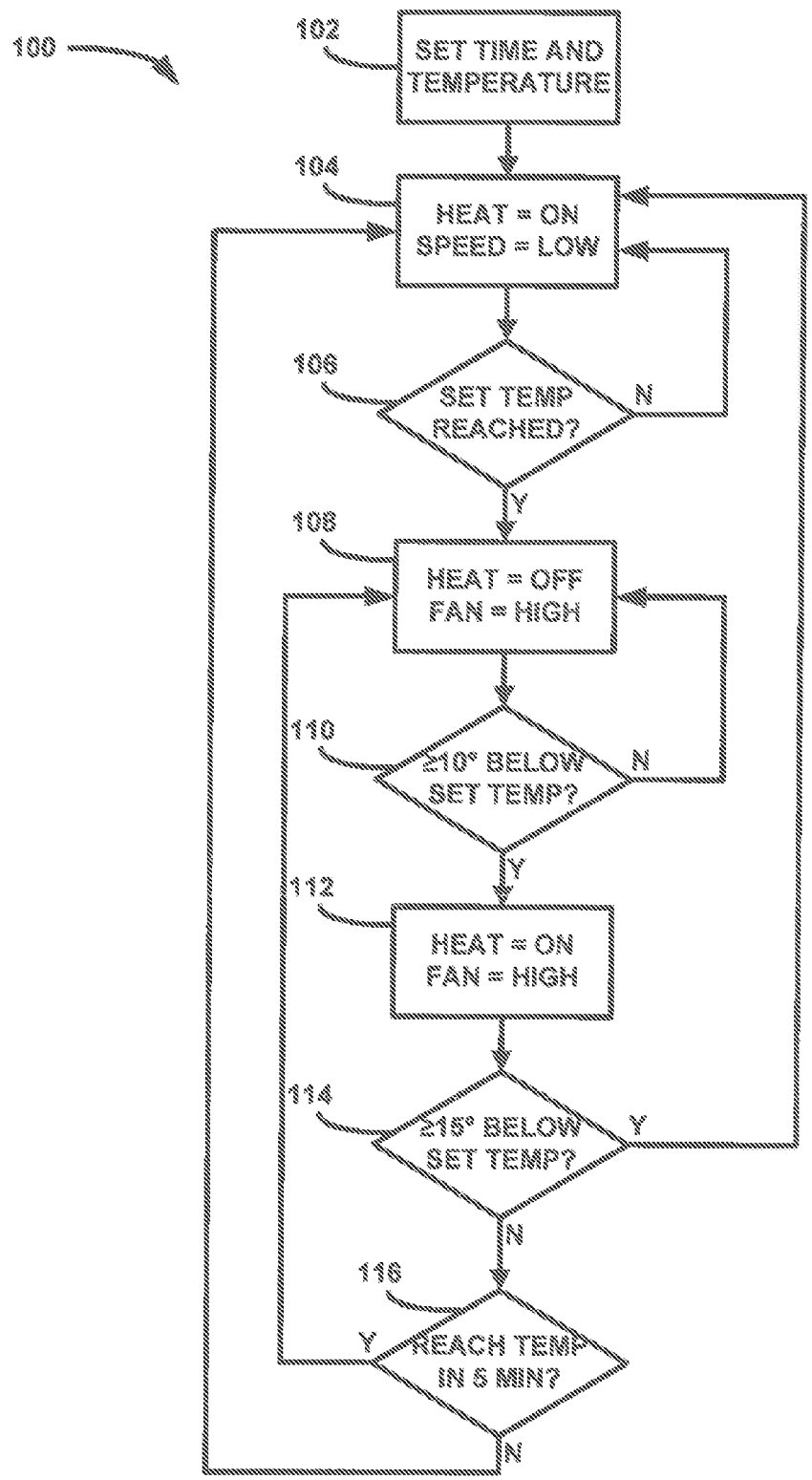
FIG. 3 is a diagram illustrating a process performed by the dehydrator of FIG. 1.

A diagram illustrating a method or process 100 performed by the dehydrator 10 is illustrated in FIG. 3. More specifically, the process 100 is programmed into the controller 44, which executes the steps illustrated in FIG. 3 to control operation of the HV system 30, which dictates operation of the dehydrator 10. In this description of the process 100 performed by the dehydrator 10, the steps are described in sequence as shown in the FIG. 3. The steps of the process 100 can, however, be performed in alternative sequences. For example, certain steps in the process 100 can be repeated or performed out of order. Additionally, some steps in the process 100 can be repeated in a loop prior to proceeding.

Referring to FIG. 3, the process 100 begins at step 102, where the desired time (duration) and temperature of the dehydration process are set by the user via the user interface 42 (see FIG. 2).

The process 100 then proceeds to step 104, where the controller 44 sets the heater 34 ON and the fan 32 is set to LOW speed. The process 100 then proceeds to step 106 and determines whether the temperature set in step 102 has been met. The controller 44 executes step 106 by measuring the temperature in the dehydration chamber 16 of the dehydrator 10 via the temperature sensor 46.

If, at step 106, it is determined that the set temperature has not yet been reached, the process 100 reverts back to step 104. The heater 34 remains set ON and the fan 32 is set to LOW speed. The process 100 proceeds from step 104 in the manner described above. If, at step 106, it is determined that the set temperature has been reached, the process 100 proceeds to step 108. The controller sets the heater 34 to OFF and sets the fan 32 to HIGH speed.

The process 100 then proceeds to step 110 and determines whether the temperature in the dehydration chamber 16, measured via the temperature sensor 46, has fallen ten degrees or more below the set temperature selected by the user. If, at step 110, it is determined that the temperature in the dehydration chamber 16 has not fell ten degrees or more below the set temperature, the process 100 reverts back to step 108. The heater 34 remains set OFF and the fan 32 is set to HIGH speed. The process 100 proceeds from step 108 in the manner described above. If, at step 110, it is determined that the temperature in the dehydration chamber 16 has fallen ten degrees or more below the set temperature, the process 100 proceeds to step 112. The heater 34 is set ON and the fan 32 is set to HIGH speed.

The process 100 then proceeds to step 114 and determines whether the temperature in the dehydration chamber 16, measured via the temperature sensor 46, has fell fifteen degrees or more below the set temperature selected by the user. If, at step 114, it is determined that the temperature in the dehydration chamber 16 has fallen fifteen degrees or more below the set temperature, the process 100 reverts beck to step 104. The heater 34 is set ON and the fan 32 is set to LOW speed. The process 100 proceeds from step 104 in the manner described above. If, at step 114, it is determined that the temperature in the dehydration chamber 16 has not fallen fifteen degrees or more below the set temperature, the process 100 proceeds to step 116 and determines initiates a five minute timer.

If, at any time within the five minute timer of step 116, temperature in the dehydration chamber 16, measured via the temperature sensor 46, has reached the set temperature selected by the user, the process reverts back to step 108. The heater 34 is set OFF and the fan 32 is set to HIGH speed. The process 100 proceeds from step 108 in the manner described above. If, after expiration of the five minute timer of step 116, temperature in the dehydration chamber 16, measured via the temperature sensor 46, has not reached the set temperature selected by the user, the process reverts back to step 104. The heater 34 is set ON and the fan 32 is set to LOW speed. The process 100 proceeds from step 104 in the manner described above. This process 100 of temperature control continues until the timer set at step 102 expires.

The process 100 set forth above provides an efficient method implemented via the control system 40 for maintaining the temperature in the dehydrating chamber 16, while accounting for ambient conditions without measuring the ambient temperature. When the dehydrator 10 is powered on and the process 100 is initiated by selecting the time and temperature, the process initially sets the heat ON and the fan speed LOW so as to add maximum heat to the dehydrating chamber 16 (step 104). LOW fan speed allows more heat to be added because loss air is moved through the dehydration chamber in the flow-through design of the dehydrator. This maximum heat is added until the set temperature is reached (step 106). The control loop of steps 104 and 106 of the process 100 thus represent a maximum heat or MAX HEAT mode of the dehydrator 10.

Upon initial system startup, the MAX HEAT mode of steps of 104 and 106 serves as a warm-up cycle for the dehydrator 10. The dehydrator 10 system remains in the MAX HEAT mode until the set temperature is reached. Therefore, the dehydrator 10 and the control system 40 is heated to the set temperature regardless of ambient temperature conditions. If the environment is hot, the temperature will be reached comparatively quickly. If the environment is cold, it will take more time for the set temperature to be reached. The process 100 thus advantageously accounts for ambient conditions.

Once the set temperature is reached in the dehydration chamber 16, the heat is set OFF and the fan is set to HIGH speed (step 108). This provides maximum air flow through the dehydration chamber 16, therefore providing maximum dehydration (i.e., moisture removing) performance. The control loop of steps 108 and 110 of the process 100 thus represent a maximum dehydration or MAX DEHYDRATE mode of the dehydrator 10.

The dehydrator 10 remains in the MAX DEHYDRATE mode until the temperature in the dehydration chamber 16 falls to ten degrees or more below the set temperature (step 110). Once this occurs, the heat is set ON in an attempt to maintain the temperature in the dehydration chamber while the fan remains on HIGH speed. The dehydrator 10 is given five minutes to come back up to the temperature set by the user (step 116). If the temperature is reached, the heat is set OFF and the dehydrator 10 continues to operate in the maximum dehydration mode (see step 108). Ideally, the environmental conditions will allow for the set temperature to be achieved within the five minute time period so that maximum dehydration can continue throughout the dehydration cycle. If, however, the five minute time period elapses without the set temperature being achieved, the dehydrator is placed in the MAX HEAT mode (see step 104) until the set temperature is reached.

If, for some reason, the temperature in the dehydration chamber falls below the set temperature by fifteen degrees or more, the process can automatically revert to the max heat mode without waiting five minutes. This may be the case, for instance, in extremely cold ambient conditions. The dehydrator 10 thus can avoid temperatures continuing to fall while the five minute reheat timer counts down. The control loop of steps 112, 114, and 116 of the process 100 thus represent a MAINTAIN mode in which the dehydrator 10 attempts to maintain the operation of the dehydrator in the MAX DEHYDRATE mode. If the MAINTAIN mode is successful, the dehydrator 10 continues in the MAX DEHYDRATE mode. If the MAINTAIN mode is unsuccessful, the dehydrator 10 reverts back to the MAX HEAT mode.

While aspects of the present invention have been particularly shown and described with reference to the preferred embodiment above, it will be understood by those of ordinary skill in the art that various additional embodiments may be contemplated without departing from the spirit and scope of the present invention. For example, while the dehydrator is illustrated as being configured with certain dimensions that produce a certain food drying capacity, those dimensions could be adjusted to achieve any desired capacity. For instance, the dimensions could be selected so that the dehydrating chamber takes on a cubic configuration, i.e., about half the illustrated dehydrator size. Other aspects, objects, and advantages of the present invention can be obtained from a study of the drawings, the disclosure, and the appended claims.

Having described the invention, we claim:

1. A process for dehydrating products with a dehydrator that includes a dehydration chamber, a heater for heating air in the dehydration chamber, and a fan for circulating air in the dehydrator, the process comprising:
   receiving a set temperature at which to perform the dehydration;
   receiving a set time for which to perform the dehydration;

setting the heater to operate in an on condition and setting the fan to run at a low speed until the temperature in the dehydration chamber reaches the set temperature;

thereafter, when the temperature in the dehydration chamber reaches the set temperature, setting the heater to an off condition and setting the fan to run at a high speed.

2. The process recited in claim 1, further comprising:

while the heater is in the off condition and the fan is set to run at the high speed, determining whether the temperature in the dehydration chamber falls to or below a first predetermined temperature less than the set temperature;

continuing to run the fan at the high speed with the heater in the off condition in response to determining that the temperature in the dehydration chamber has not fallen to or below the first predetermined temperature; and continuing to run the fan at the high speed and setting the heater to operate in the on condition in response to determining that the temperature in the dehydration chamber has fallen to or below the first predetermined temperature.

3. The process recited in claim 2, wherein the first predetermined temperature is ten degrees below the set temperature.

4. The process recited in claim 2, further comprising:

while the heater is in the on condition and the fan is set to run at the high speed, setting a timer to countdown a predetermined amount of time;

determining whether the temperature in the dehydration chamber reaches the set temperature within the predetermined amount of time;

continuing to run the fan at the high speed and setting the heater to operate in the off condition in response to determining that the temperature in the dehydration chamber has reached the set temperature any time within the countdown; and after the countdown expires, setting the fan to run at the low speed and continuing to operate the heater in the on condition in response to determining that the temperature in the dehydration chamber has not reached the set temperature.

5. The process recited in claim 4, further comprising:

determining whether the temperature in the dehydration chamber falls to or below a second predetermined temperature less than the set temperature, the second predetermined temperature being lower than the first predetermined temperature; and in response to determining that the temperature in the dehydration chamber falls to or below a second predetermined temperature less than the set temperature, setting the heater to the on condition and setting the fan to run at the low speed.

6. The process recited in claim 5, wherein the second predetermined temperature is fifteen degrees below the set temperature.

7. The process recited in claim 4, further comprising:

determining whether the temperature in the dehydration chamber falls to or below a second predetermined temperature less than the set temperature, the second predetermined temperature being lower than the first predetermined temperature; and while the fan is running in the high speed and the heater is in the on condition, and in response to determining that the temperature in the dehydration chamber falls to or below a second predetermined temperature less than the set temperature, setting the heater to the on condition and setting the fan to run at the low speed.

8. The process recited in claim 7, wherein the second predetermined temperature is fifteen degrees below the set temperature.

* * * * *